(12) United States Patent
Ha et al.

(10) Patent No.: US 9,001,151 B2
(45) Date of Patent: Apr. 7, 2015

(54) MOBILE TERMINAL FOR DISPLAYING A PLURALITY OF IMAGES DURING A VIDEO CALL AND CONTROL METHOD THEREOF

(75) Inventors: Yusol Ha, Seoul (KR); Juha Hyun, Seoul (KR); Sunmi Choi, Anyang-si (KR); Jeongeun Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 13/523,771

(22) Filed: Jun. 14, 2012

(65) Prior Publication Data
US 2013/0155099 A1 Jun. 20, 2013

(30) Foreign Application Priority Data
Dec. 15, 2011 (KR) .................. 10-2011-0135819

(51) Int. Cl.
*H04N 7/14* (2006.01)
*H04M 1/725* (2006.01)

(52) U.S. Cl.
CPC . *H04M 1/72522* (2013.01); *G06F 2203/04802* (2013.01); *G06F 2203/04803* (2013.01); *H04M 2250/62* (2013.01); *H04N 2007/145* (2013.01)

(58) Field of Classification Search
CPC .................. H04M 2250/22; H04M 2250/62
USPC ........................................................ 345/619
See application file for complete search history.

(56) References Cited

U.S. PATENT DOCUMENTS

| 2004/0130522 | A1* | 7/2004 | Lin et al. ................. 345/156 |
| 2006/0200518 | A1* | 9/2006 | Sinclair et al. ............. 709/204 |
| 2009/0244019 | A1* | 10/2009 | Choi .......................... 345/173 |
| 2010/0097438 | A1* | 4/2010 | Ujii .......................... 348/14.01 |
| 2010/0162316 | A1* | 6/2010 | Kim ............................. 725/44 |
| 2011/0187709 | A1* | 8/2011 | Lee et al. .................... 345/419 |
| 2011/0270933 | A1 | 11/2011 | Jones et al. |

FOREIGN PATENT DOCUMENTS

EP  2105827  9/2009

OTHER PUBLICATIONS

European Patent Office Application Serial No. 12005562.9, Search Report dated Apr. 3, 2013, 6 pages.

* cited by examiner

*Primary Examiner* — Kee M Tung
*Assistant Examiner* — Ryan D McCulley
(74) *Attorney, Agent, or Firm* — Lee, Hong, Degerman, Kang & Waimey

(57) ABSTRACT

A mobile terminal having a video call function and a control method thereof are provided. The mobile terminal includes: a display unit configured to allow for a touch input and display a plurality of images received from a plurality of counterparts, respectively, during a video call; a sensing unit configured to sense a touch input with respect to at least one of the plurality of images; and a controller changing the touched image to any one of images related to the touched image. The image to be changed among the related images is determined on the basis of a direction of the touch input.

13 Claims, 15 Drawing Sheets

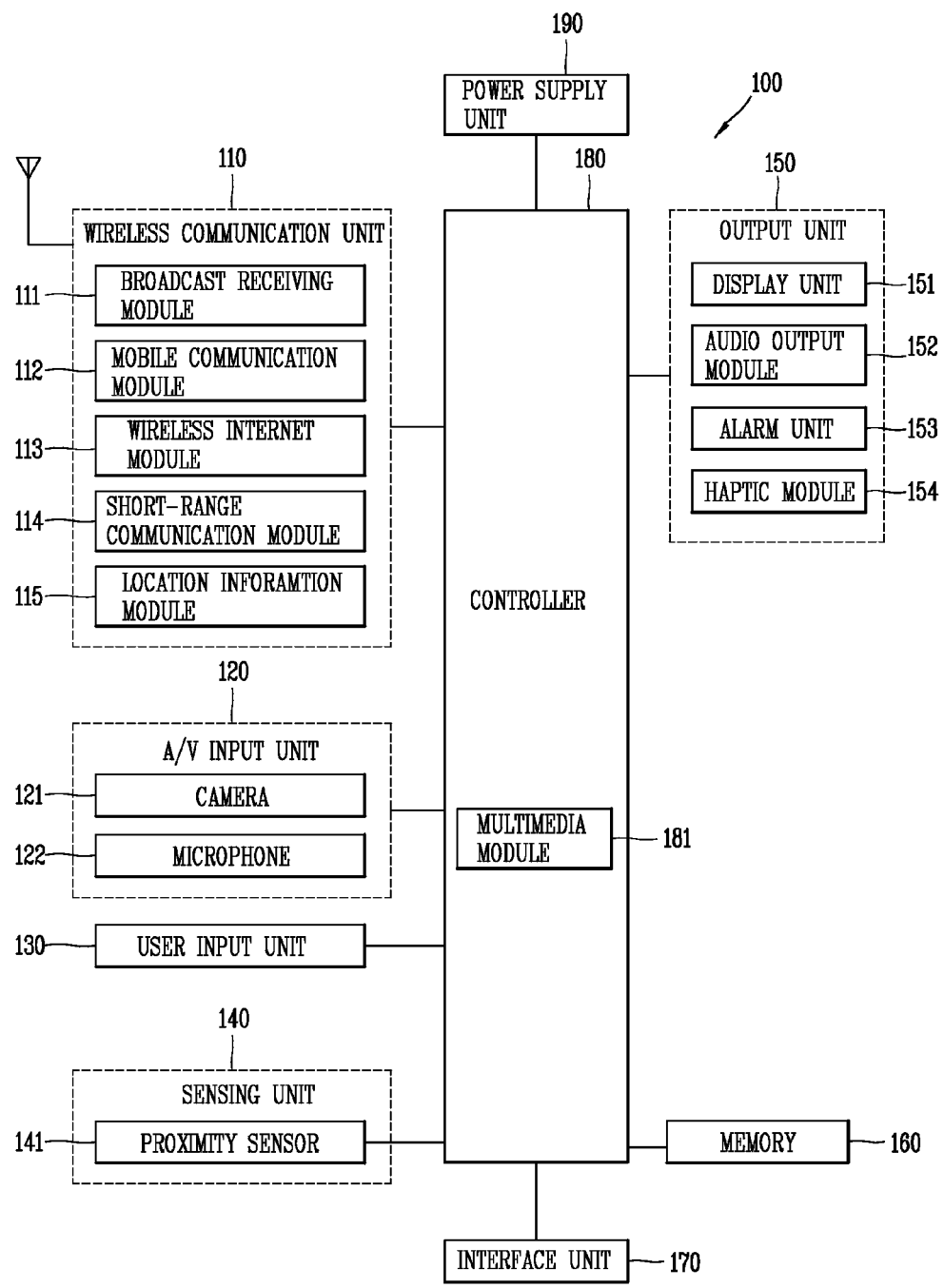

MOBILE TERMINAL FOR DISPLAYING A PLURALITY OF IMAGES DURING A VIDEO CALL AND CONTROL METHOD THEREOF

CROSS-REFERENCE TO RELATED APPLICATION

Pursuant to 35 U.S.C. §119(a), this application claims the benefit of earlier filing date and right of priority to Korean Patent Application No. 10-2011-0135819, filed on Dec. 15, 2011, the contents of which are incorporated by reference herein in its entirety.

BACKGROUND OF THE INVENTION

1. Field of the Invention

The present disclosure relates to a mobile terminal, and particularly, to a mobile terminal having a video call function and a control method thereof.

2. Background of the Invention

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

Meanwhile, a mobile terminal may have a video call function. In addition, a user may simultaneously perform a video call with a plurality of counterparts. In this case, a plurality of images received from the plurality of counterparts may be displayed on the screen of the terminal.

However, when the user performs a video call simultaneously with a plurality of counterparts, a control window displayed to control a video call function inevitably covers a plurality of images, so the user cannot properly view the plurality of images while the video call function is being controlled.

SUMMARY OF THE INVENTION

Therefore, an aspect of the detailed description is to provide a mobile terminal capable of improving user convenience in relation to controlling a video call function when a user performs a video call simultaneously with a plurality of counterparts, and a control method thereof.

To achieve these and other advantages and in accordance with the purpose of this specification, as embodied and broadly described herein, a mobile terminal including: a display unit configured to allow for a touch input and display a plurality of images received from a plurality of counterparts, respectively, during a video call; a sensing unit configured to sense a touch input with respect to at least one of the plurality of images; and a controller changing the touched image to any one of images related to the touched image, wherein the image to be changed among the related images is determined on the basis of a direction of the touch input.

When a touch input is sensed within a reference time with respect to the changed image, the controller may control a function related to a video call with respect to a counterpart corresponding to the touched image in response to the touch input, and when a touch input is not sensed within the reference time with respect to the changed image, the controller may restore the changed image into the previous image of the changed image.

The changed image may include an input window, and when a touch input applied to the input window is sensed, the controller may change a trace of the touch input into image data and store the image data in a memory.

When the trace of the touch input is recognized as a handwritten character, the controller may change the trace of the touch input to text data, and store the text data in the memory.

In response to a touch input sensed after the trace of the touch input is changed to at least one of the image data and the text data, the controller may restore the changed image into the previous image of the changed image, and display at least one of the image data and the text data on the restored image.

The changed image may include an object related to a social network service (SNS), and when a touch input with respect to the object is sensed, the controller may display at least one of contents posted in an SNS server of a counterpart corresponding to the touched image on the changed image, in response to the touch input.

The controller may vary an amount of content displayed on the changed image according to the degree of a touch applied to the object.

The changed image may include a content list stored in the memory, and when at least one content on the content list is selected, the controller may transmit the selected content to the counterpart corresponding to the touched image.

A control image including information related to the video call of the plurality of counterparts may be displayed in a first screen region, and images received from the plurality of counterparts may be displayed, respectively, in a second screen region, and when a touch input with respect to the control image is sensed, the controller may change the control image to any one of different control images on the basis of a direction of the touch input.

When a touch input is sensed within the reference time with reference to the changed control image, the controller may control a function related to the video call corresponding to the changed control image in response to the touch input, and when a touch input is not sensed within the reference time with reference to the changed control image, the controller may restore the changed control image to the previous control image of the changed control image.

The information related to the video call of the plurality of counterparts may include at least one of information regarding the number of times of speaking, information regarding a speaking time, and information regarding speaking order of each of the plurality of counterparts.

The changed control image may include an input window for receiving at least one of information regarding a limitation of the number of times of speaking, information regarding a limitation of a speaking time, and information regarding speaking order, and when at least one of the information regarding a limitation of the number of times of speaking, the information regarding a limitation of a speaking time, and the information regarding speaking order is received, the controller may transmit the received information to at least any one of the plurality of counterparts.

The changed control image may include thumbnail images corresponding to the images received from the plurality of counterparts, respectively, and the controller may group some of the plurality of counterparts in response to a touch input with respect to the received images and a touch input with respect to the thumbnail images.

The controller may group images corresponding to the grouped counterparts among the received images and display the same, and when a touch input applied to the grouped images is sensed within the reference time, the controller may control a function related to the video call with respect to the grouped counterparts together in response to the touch input, and when a touch input applied to the grouped images is not sensed within the reference time, the controller may release the grouping of the grouped counterparts.

The controller may control at least one of a size and a three-dimensional depth value of an image received from a counterpart who is currently speaking such that the image received from the counterpart who is currently speaking is differentiated from the other remaining images.

The controller may gradually change at least one of the size and the three-dimensional depth value of the image received from the counterpart who is currently speaking on the basis of information regarding a speaking time of the counterpart who is currently speaking.

The controller may control at least one of the size and the three-dimensional depth value of each of the images received from the plurality of counterparts on the basis of at least one of information regarding the number of times of speaking, information regarding a speaking time, and information regarding speaking order of each of the plurality of counterparts.

To achieve these and other advantages and in accordance with the purpose of this specification, as embodied and broadly described herein, a control method of a mobile terminal including a display unit configured to allow for a touch input and display a plurality of images received from a plurality of counterparts, respectively, during a video call, including: sensing a touch input with respect to at least one of the plurality of images; and changing the touched image to any one of images related to the touched image on the basis of a direction of the touch input.

The method may further include: controlling a function related to a video call with respect to a counterpart corresponding to the touched image in response to the touch input, when a touch input is sensed within a reference time with respect to the changed image, and restoring the changed image into the previous image of the changed image, when a touch input is not sensed within the reference time with respect to the changed image.

The method may further include: sensing a touch input with respect to a control image including information related to a video call of the plurality of counterparts; and changing the control image to any one of different control images on the basis of a direction of the touch input.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram of a mobile terminal related to the present invention.

DETAILED DESCRIPTION OF THE INVENTION

Figure 2A:
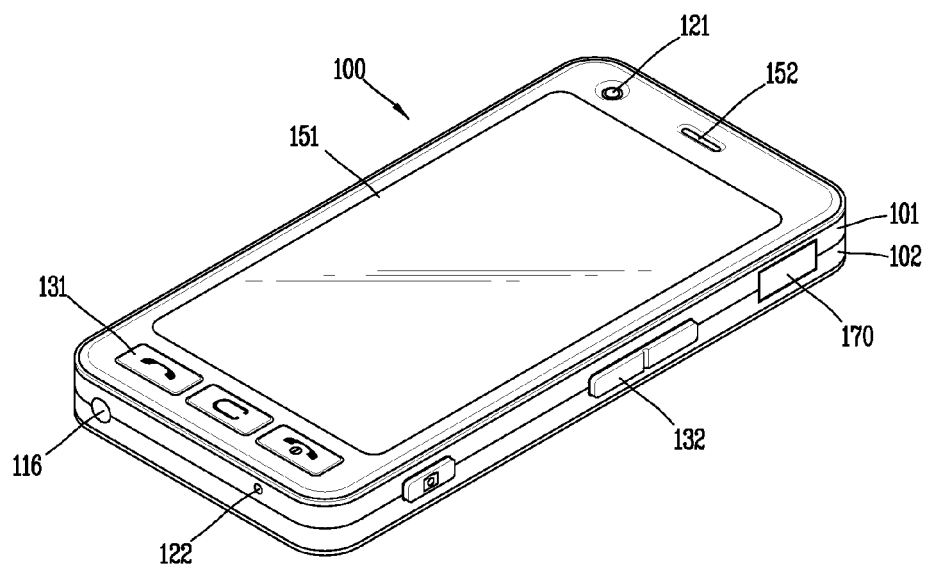
FIGS. 2A and 2B are perspective views showing an external appearance of the mobile terminal related to the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

FIG. 1 is a block diagram of a mobile terminal 100 according to one embodiment of the present disclosure.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component (110~190) of the mobile terminal 100 is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel. The broadcast associated information may indicate information relating to a broadcasting channel, a broadcasting program or a broadcasting service provider. The broadcast associated information may be provided through a mobile communication network. In this case, the broadcast associated information may be received via the mobile communication module 112. Broadcasting signals and/or broadcasting associated information may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display unit 151. The image frames processed by the camera 121 may be stored in the memory 160 or transmitted to the exterior via the wireless communication unit 110. Two or more cameras 121 may be provided according to the use environment of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling or other connection between the interface unit 170 and an external device and the like.

Moreover, the sensing unit 140 may include a proximity sensor 141, which will be later explained in relation to a touch screen. The sensing unit 140 may include a touch sensor (not shown) for sensing a touch operation with respect to the display unit 151.

The touch sensor may be implemented as a touch film, a touch sheet, a touch pad, etc. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

Here, if the touch sensor and the display unit 151 have a layered structure therebetween, the structure may be referred to as a touch screen. The display unit 151 may be used as an input device rather than an output device.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into a proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to output an audio signal, a video signal or an alarm signal. The output unit 150 may include a display unit 151, an audio output module 153, an alarm 154, and a haptic module 155.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may include at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to functions performed in the mobile terminal 100, e.g., sound alarming a call received or a message received, and so on. The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. For instance, the alarm 154 may be configured to vibrate responsive to the mobile terminal receiving a call or message. As another example, when a key signal has been inputted, the alarm 154 may output vibration as a feedback of the key signal input. Through this vibration output, a user may recognize the occurrence of an event. In order to output a signal in a vibration manner, the mobile terminal may be mounted with a vibrator. Here, the video signal or audio signal may be outputted through the display unit 151 or the audio output module 153.

The haptic module 155 generates various tactile effects which a user can feel. A representative example of the tactile effects generated by the haptic module 155 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects (signals) through a user's direct contact, or a user's muscular sense using a finger or a hand. The haptic module 155 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 2B:
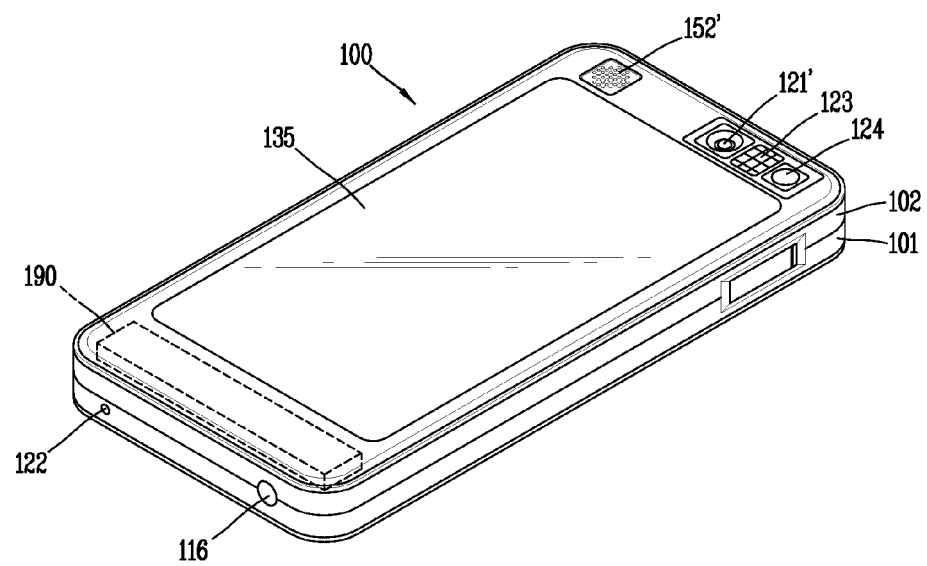

FIG. 2A is a view showing a front surface and one side surface of the mobile terminal 100 in accordance with the present disclosure, and FIG. 2B is a view showing a rear surface and another side surface of the mobile terminal 100 of FIG. 2A.

As shown in FIG. 2A, the mobile terminal 100 is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, a user input unit 130 (refer to FIG. 1), a microphone 122, an interface unit 170, etc.

The display unit 151 occupies most parts of a main surface of the front case 101. The audio output unit 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

The manipulation units 131 and 132 may receive various commands. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, a camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use.

The cameras 121 and 121' may be installed at the terminal body so as to rotate or pop-up.

A flash 123 and a mirror 124 (not shown) may be additionally disposed close to the camera 121'. The flash 123 operates in conjunction with the camera 121' when taking a picture using the camera 121'. The mirror 124b can cooperate with the camera 121' to allow a user to photograph himself in a self-portrait mode.

An audio output unit 152' may be additionally arranged on a rear surface of the terminal body. The audio output unit 152' may cooperate with the audio output unit 152 (refer to FIG. 2A) disposed on a front surface of the terminal body so as to implement a stereo function. Also, the audio output unit 152' may be configured to operate as a speakerphone.

A broadcast signal receiving antenna 116 as well as an antenna for calling may be additionally disposed on a side surface of the terminal body. The broadcast signal receiving antenna 116 of the broadcast receiving module 111 (refer to FIG. 1) may be configured to retract into the terminal body.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151 (refer to FIG. 2A), the touch pad 135 may be formed to be light-transmissive. The touch pad 135 may be also additionally mounted with a rear display unit for outputting visual information. Information output from the display unit 151 (front display) and the rear display can be controlled by the touch pad 135.

The touch pad 135 operates in association with the display unit 151. The touch pad 135 may be disposed on the rear surface of the display unit 151 in parallel. The touch pad 135 may have a size equal to or smaller than that of the display unit 151.

Meanwhile, the mobile terminal 100 may have a video call function. In addition, the user may perform a video call simultaneously with a plurality of counterparts. In this case, a plurality of images received from the plurality of counterparts, respectively, may be displayed on the display unit 151 of the mobile terminal.

However, when the user performs a video call simultaneously with the plurality of counterparts, a control window displayed to control the video call function covers the plurality of images, so the user cannot properly view the plurality of images while the video call function is being controlled, causing user inconvenience.

Thus, hereinafter, the mobile terminal 100 and a control method thereof capable of improving user convenience in relation to controlling of the video call function when a video call is performed simultaneously with a plurality of counterparts will be described with reference to the accompanying drawings.

Figure 3:
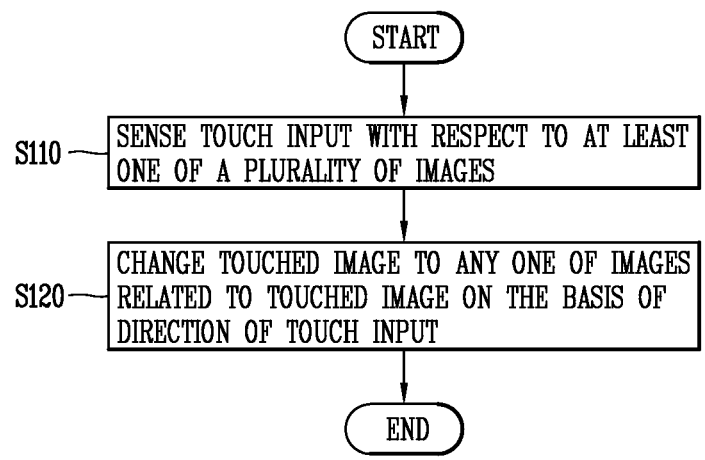
FIG. 3 is a flow chart illustrating a control method of a mobile terminal according to an embodiment of the present invention.

FIG. 3 is a flow chart illustrating a control method of the mobile terminal (See FIG. 1) according to an embodiment of the present invention. The mobile terminal 100 includes the display unit 151 (See FIG. 1), the sensing unit 140 (See FIG. 1), and the controller 180 (See FIG. 1).

Referring to FIG. 3, a touch input with respect to at least one of a plurality of images is detected in step S110.

In detail, the display unit 151 may be formed to allow for a touch input. The plurality of images received from a plurality of counterparts during a video call may be displayed on the display unit 151, or different images substituting the images received from the counterparts may be displayed. Also, information regarding each of the counterparts may be displayed in a text form on the images received from the counterparts. Such information may be displayed by using information registered to a phone book of the user or may be displayed by using information arbitrarily received from the user.

The controller 180 may assign a three-dimensional (3D) depth value to each of the images received from the plurality of counterparts. In detail, the controller 180 may control 3D depth values of the respective images received from the plurality of counterparts on the basis of at least one of information regarding the number of times of speaking, information regarding a speaking time, and information regarding speaking order of each of the plurality of counterparts. Accordingly, the user can recognize a speaking share of each of the plurality of counterparts by intuition (or at a glance).

The sensing unit 140 may sense a touch input with respect to at least one of the plurality of images. Also, the sensing unit 140 may detect a type and a direction of the sensed touch input.

Next, on the basis of the direction of the touch input, a touched image is changed to any one of images related to the touched image in step S120.

In detail, the images related to the touched image may include a control window for controlling a function related to the video call with respect to a counterpart (hereinafter, referred to as a 'selected counterpart') corresponding to the touched image.

For example, the related images may include a control window for preventing the selected counterpart from joining the video call, a control window for transmitting and receiving a voice signal to and from only the selected counterpart, a control window for transmitting content or a gift coupon in the form of a barcode to the selected counterpart, and the like.

Also, the related images may include a control window for concealing the image of the selected counterpart from the screen, a control window for displaying image data or text data on the image of the selected counterpart, a control image for changing the image of the selected counterpart to a different image, and the like.

The controller 180 may change the touched image to any one of the images. In this case, the image to be changed may be determined on the basis of the detected direction of the touch input.

In detail, when a touch input in one direction with respect to any one of a plurality of images is sensed, the controller 180 may provide an animation effect that a 3D rectangular parallelepiped rotates by 90 degrees in one direction. Thereafter, a different image corresponding to the front side of the 90-degree rotated 3D rectangular parallelepiped may be displayed on the display unit 151.

Also, when a touch input in one direction with respect to any one of a plurality of images is sensed, the controller 180 may provide an animation effect that a page is turned in one direction. Thereafter, a different image corresponding to a next page may be displayed on the display unit 151.

Meanwhile, although not shown, when a touch input is sensed within a reference time with respect to the changed image, the controller 180 may control a function related to the video call with respect to the selected counterpart in response to the touch input. Meanwhile, when a touch input is not sensed within the reference time with respect to the changed image, the controller 180 may restore the changed image.

In detail, the controller 180 may measure a time duration starting from a point in time at which the image is changed by using a timer (not shown). And, when a touch input is sensed within the reference time after the image is changed, the controller 180 may control a function related to the video call with respect to the selected counterpart. Meanwhile, when a touch input is not sensed within the reference time after the image is changed, the controller 180 may restore the changed image into the previous image before the change. Also, the time duration measured by the timer may be initialized, namely, reset to an initial value (e.g., 0 sec) when the touch input with respect to the changed image is sensed and when the changed image is restored.

As described above, in the mobile terminal 100 and the control method thereof according to an embodiment of the present invention, when the user performs a video call simultaneously with a plurality of counterparts, the control window displayed to control the video call function covers only some of a plurality of images. Thus, the user can properly, wholly view the plurality of images without having to perform complicated manipulation.

Figure 4:
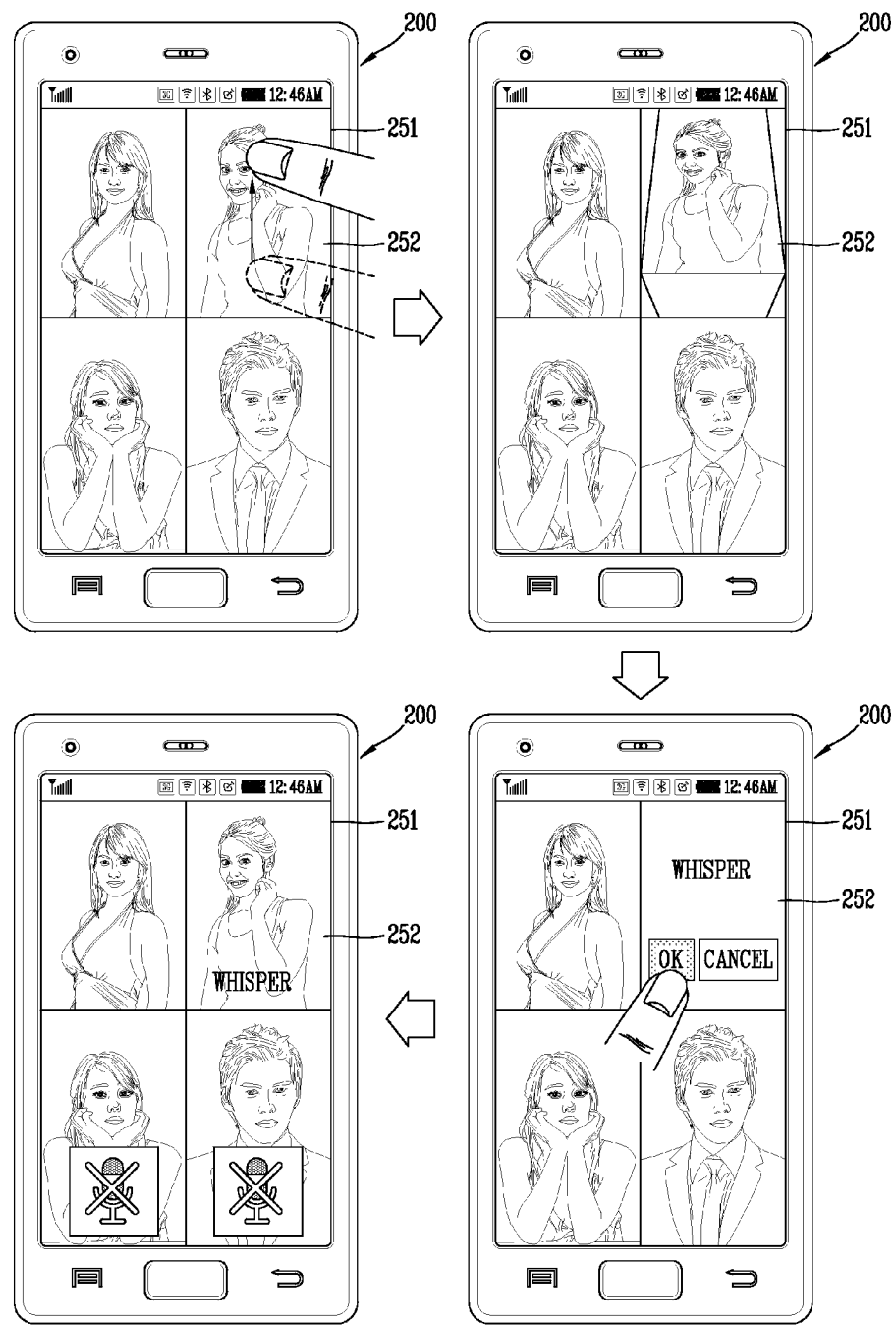
FIGS. 4 to 8 are conceptual views showing operational examples of a mobile terminal in FIG. 3.

FIG. 4 is a conceptual view showing operational examples of a mobile terminal 200 according to FIG. 3. The mobile terminal 200 includes a display unit 251, the sensing unit 140 (See FIG. 1), and the controller 180 (See FIG. 1).

Referring to FIG. 4, the display unit 251 may display a plurality of images received from a plurality of counterparts, respectively, during a video call. In this case, when a touch input with respect to any one 252 of the plurality of images is sensed, for example, when a flick gesture in a first direction (an upward direction) is sensed, the controller 180 may change the touched image (hereinafter, referred to as a 'first image') to a different image (hereinafter, referred to as a 'second image').

In detail, as illustrated, with the first image corresponding to the front side (forwarding side) of the 3D rectangular parallelepiped displayed on the display unit 251, when a flick gesture in the first direction is sensed, the controller 180 may provide an animation effect that the 3D rectangular parallelepiped rotates by 90 degrees in the first direction. Thereafter, the second image corresponding to a different side of the 3D rectangular parallelepiped, namely, the front side of the 3D rectangular parallelepiped which has been rotated by 90 degrees in the first direction, may be displayed on display unit 251.

In this case, the second image may include a control window for controlling a function related to the video call with respect to the counterpart (hereinafter, referred to as a 'selected counterpart') corresponding to the first image. For example, as illustrated, the second image may include a control window for transmitting and receiving a voice signal to and from only the selected counterpart.

Thereafter, when a touch input with respect to the second image is sensed within the reference time, the controller 180 may perform a controlling operation related to transmission of a voice signal to only the selected counterpart and reception of a voice signal from the selected counterpart.

For example, as illustrated, with the second image displayed on the display unit 251, when a control command for transmitting and receiving a voice signal only to and from the selected counterpart is sensed, the controller 180 may transmit and receive a voice signal to and from the selected counterpart but not transmit or receive a voice signal to and from the other counterparts. Also, the controller 180 may display an icon indicating that a voice signal is transmitted to and received from the selected counterpart but not transmitted to or received from the other counterparts on the display unit 251.

Figure 5:
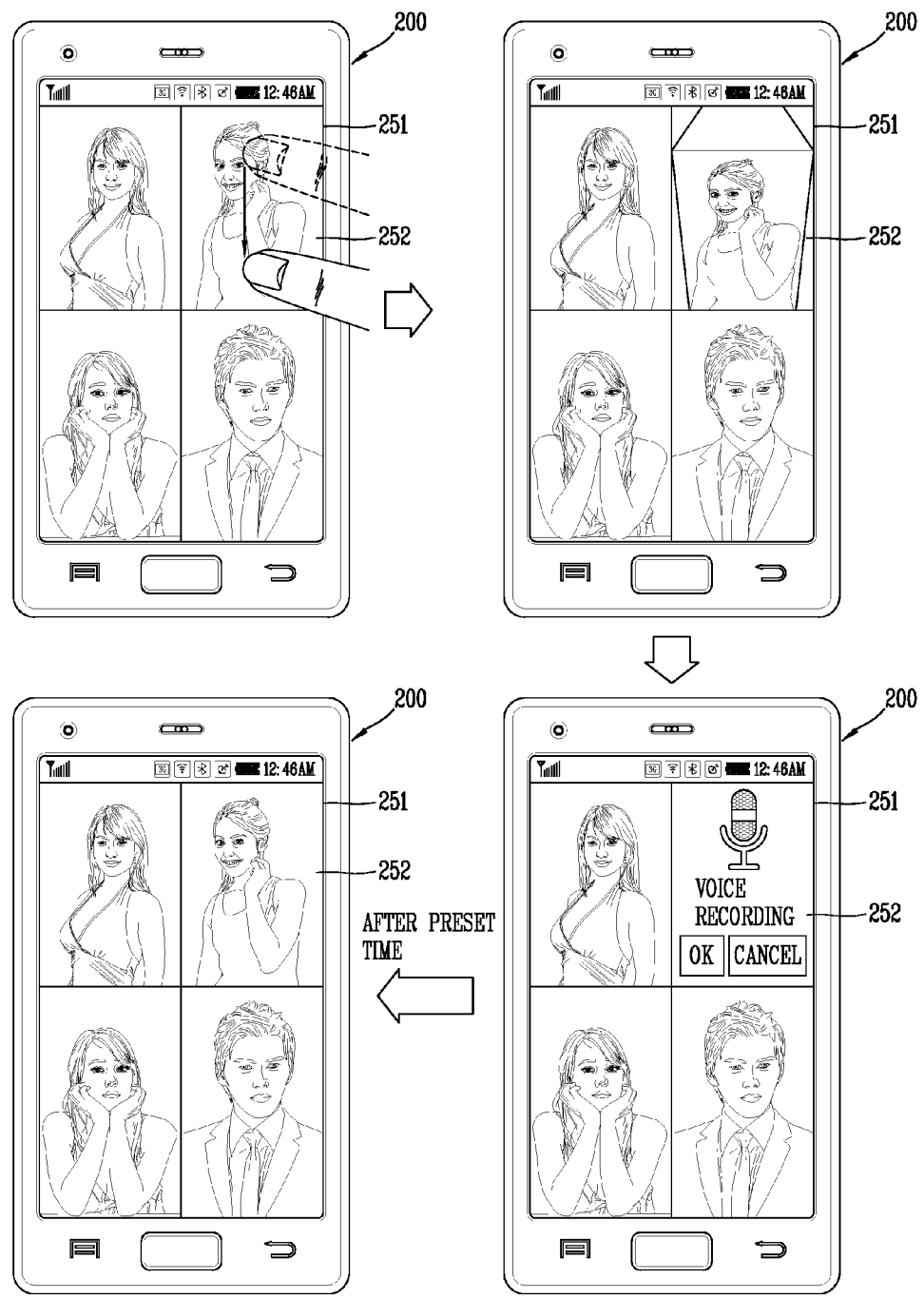

FIG. 5 is a conceptual view showing an operational example of the mobile terminal 200. The mobile terminal 200 includes the display unit 251, the sensing unit 140 (See FIG. 1), and the controller 180 (See FIG. 1).

Referring to FIG. 5, when a touch input with respect to any one 252 of a plurality of images displayed on the display unit 251 during a video call is sensed, for example, when a flick gesture in a second direction (a downward direction) is sensed, the controller 180 may change the touched image (hereinafter, referred to as a 'first image') to a different image (hereinafter, referred to as a 'second image').

The second image may include, for example, a control window for recording a voice signal received from a counterpart (hereinafter, referred to as a 'selected counterpart') corresponding to the first image. Thereafter, when a touch input with respect to the second image is not sensed within the reference time, the controller 180 may restore the changed image, namely, change the second image to the first image.

Figure 6:
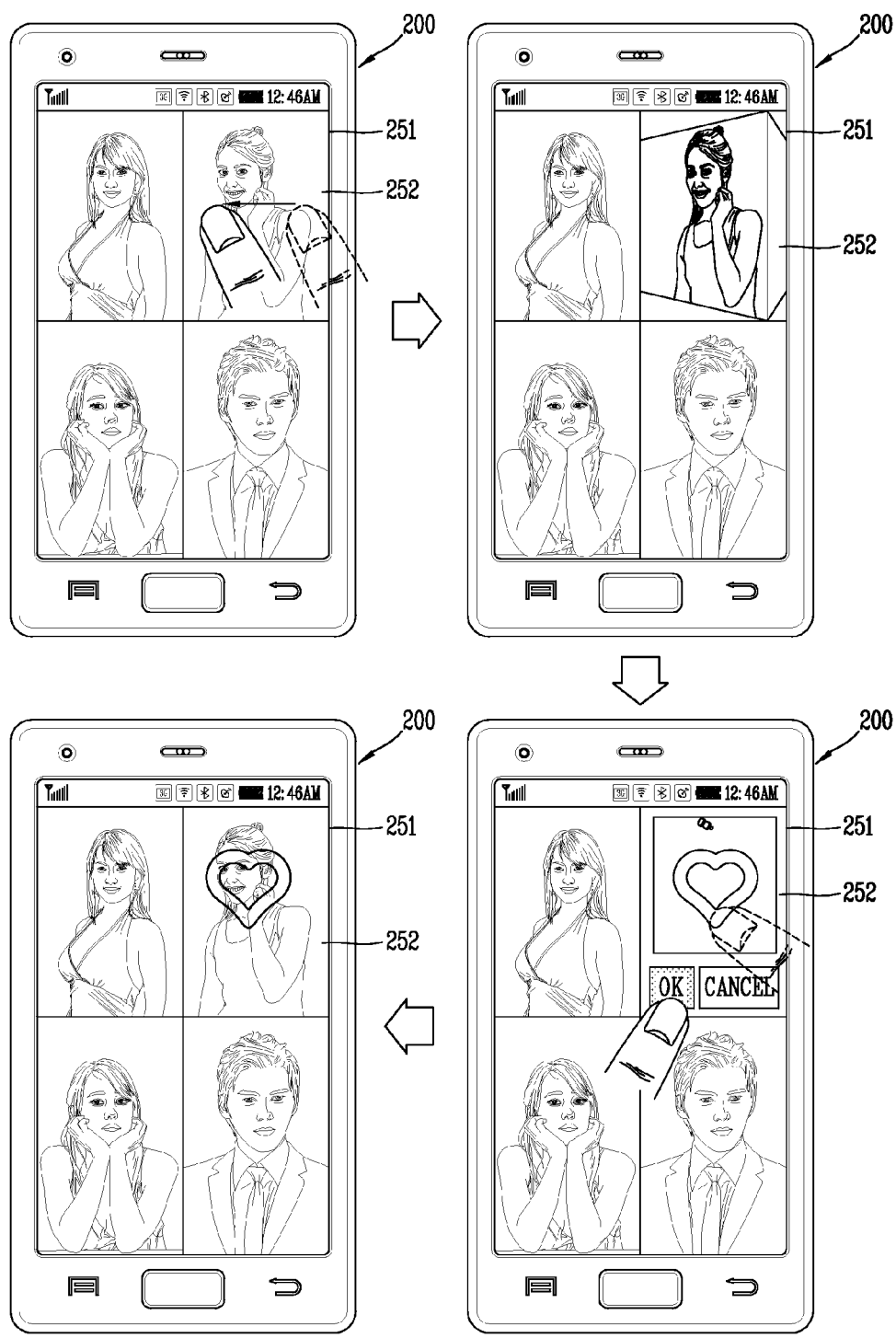
Figure 7:
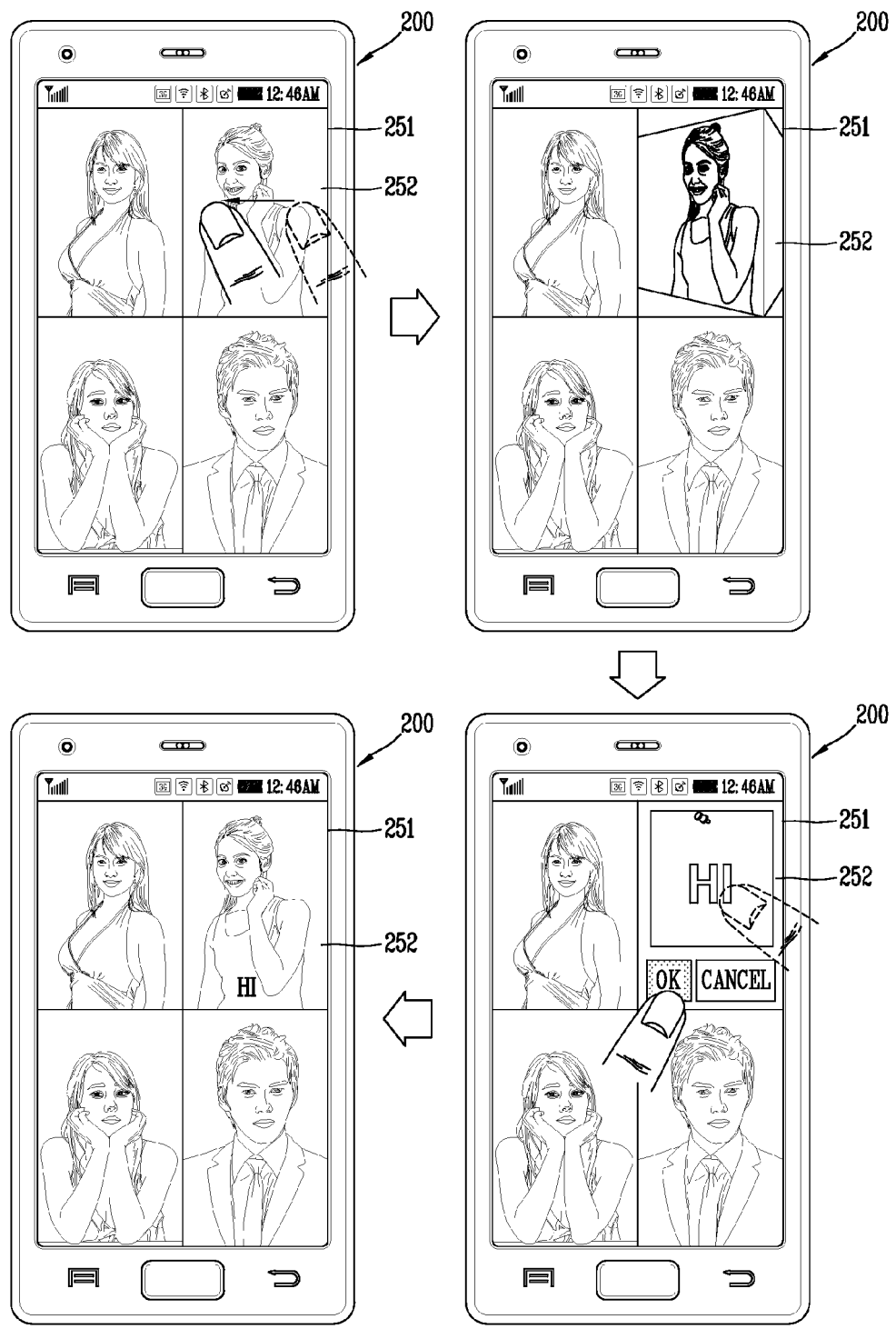

FIGS. 6 and 7 are conceptual views showing operational examples of the mobile terminal 200 according to FIG. 3. The mobile terminal 200 includes the display unit 251, the sensing unit 140 (See FIG. 1), and the controller 180 (See FIG. 1).

Referring to FIGS. 6 and 7, when any one 252 of the plurality of images displayed on the display unit 251 is sensed during a video call, for example, when a flick gesture in a third direction (from right to the left) is sensed, the controller 180 may change the touched image (hereinafter, referred to as a 'first image') to a different image (hereinafter, referred to as a 'second image'). The second image may include, for example, an input window for controlling an image received from the counterpart (hereinafter, referred to as a 'selected counterpart') corresponding to the first image.

Meanwhile, as shown in FIG. 6, when a touch input with respect to the input window included in the second image is sensed, the controller 180 may change a trace of the touch input to image data. In this case, the image data corresponding to the trace of the touch input may be stored in the memory 160 (See FIG. 1).

After the trace of the touch input is changed to the image data, when a control command for displaying the image data on the first image is sensed, the controller 180 may display the image data on the first image while changing the second image to the first image.

Also, as shown in FIG. 7, when a touch input with respect to an input window included in the second image is recognized as a handwritten character, the controller 180 may change a trace of the touch input to text data and store the same in the memory 160. For example, the controller 180 may change the trace of the touch input recognized in the input window to text data 'HI'.

After the trace of the touch input is changed to the text data, when a control command for displaying the text data on the first image is sensed, the controller may display the text data on the first image while changing the second image to the first image.

Meanwhile, although not shown, on the basis of a sensed touch input, the controller 180 may transmit at least one of the image data and the text data to the selected counterpart or may transmit at least one of the image data and the text data to all or some of the plurality of counterparts.

Figure 8:
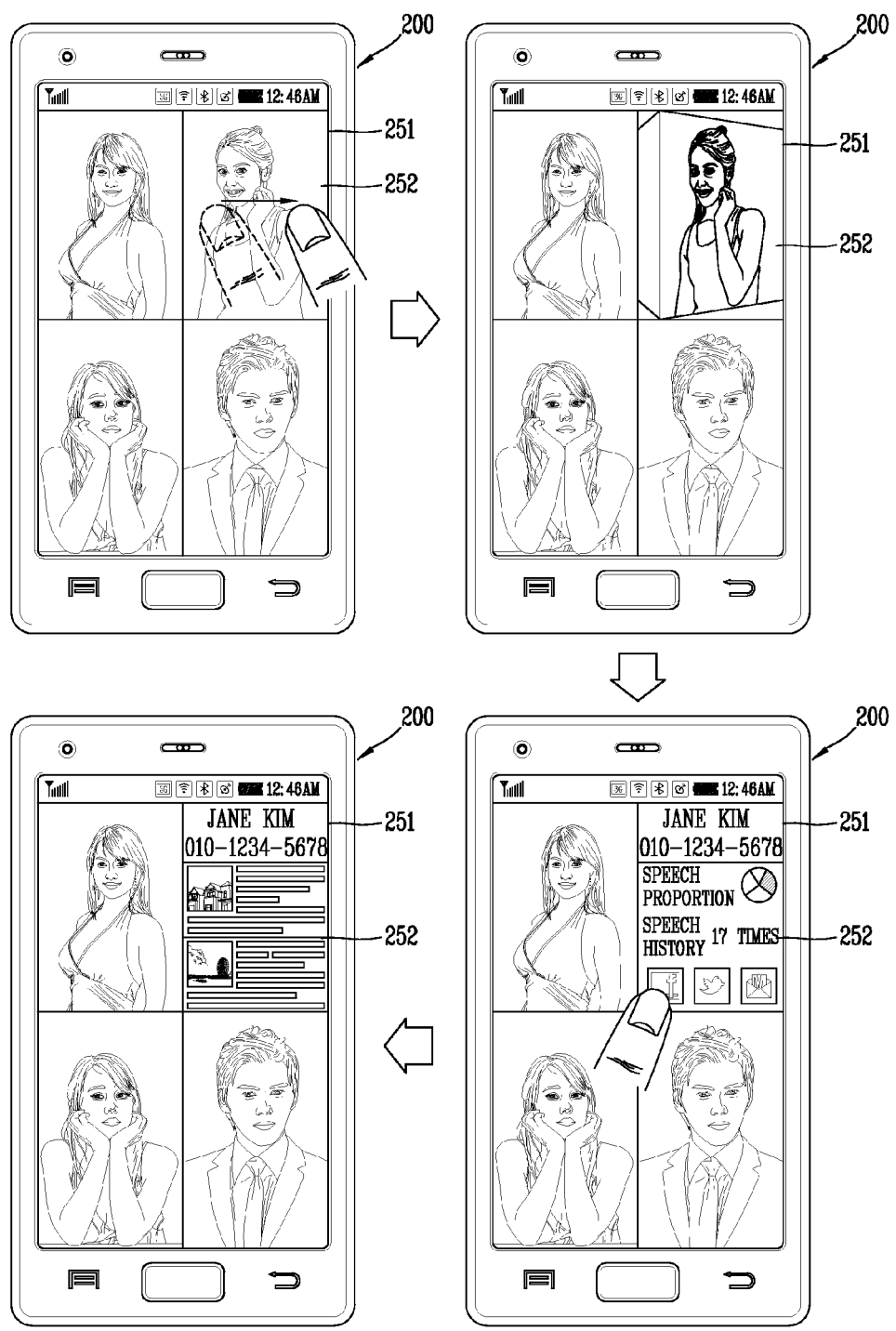

FIG. 8 is a conceptual view showing an operational example of the mobile terminal 200 according to FIG. 3. The mobile terminal 200 includes the display unit 251, the sensing unit 140 (See FIG. 1), and the controller 180 (See FIG. 1).

Referring to FIG. 8, when any one 252 of the plurality of images displayed on the display unit 251 is sensed during a video call, for example, when a flick gesture in a third direction (from left to the right) is sensed, the controller 180 may change the touched image (hereinafter, referred to as a 'first image') to a different image (hereinafter, referred to as a 'second image'). The second image may include, for example, for example, information related to the counterpart (hereinafter, referred to as a 'selected counterpart') corresponding to the first image. Although not shown, the second image may also include weather information or news information.

Here, the information related to the selected counterpart may include a name, contact information, or biorhythm information of the selected counterpart, and include at least one of information regarding the number of times of speaking, information regarding a speaking time, and information regarding speaking order of the selected counterpart, or may include an object related to a social network service (SNS). Such information may be displayed on the second image by using information registered to a phone book of the user or may be displayed on the second image by using information arbitrarily received from the user.

As illustrated, when a touch input with respect to the object related to the SNS is sensed, for example, when a single tap gesture is sensed, the controller 180 may display at least one of contents posted in an SNS server of the selected counterpart on the second image.

Meanwhile, although not shown, when a touch input with respect to the object is sensed, the controller 180 may vary the amount of content displayed on the second image according to the extent of the applied touch. In detail, when a touch input with respect to the object is sensed, the controller 180 may detect the extent of the applied touch with respect to the touched object. The controller 180 may determine the extent of the applied touch upon detecting at least one of a change in the touch operation from when the touch input starts to when the touch input is released and a duration time. Thus, although not shown, when the user drags the object extendedly, the controller 180 may display more contents on the second image.

As described above, the controller 180 may change the touched image to a different image on the basis of the direction of a touch input with respect to any one of the plurality of images displayed on the display unit 251 during a video call. Also, the controller 180 may control a function related to the video call with respect to a selected counterpart on the basis of the touch input with respect to the changed different image.

Thus, although not shown in FIGS. 4 to 8, the user may prevent a selected counterpart from joining a video call, change a voice signal received from the selected counterpart to text data, and transmit content or a gift coupon in the form of a barcode to the selected counterpart. Also, the user may conceal an image of the selected counterpart from the screen, and change the image of the selected counterpart to a different image corresponding to the look of the counterpart.

Also, the user may transmit a message including content such as a compliment, warning, leaving, or the like, to a plurality of counterparts. Also, the user may designate the number of times of speaking, a speaking time, and speaking order of each of the plurality of counterparts, and transmit a message including such content to the plurality of counterparts.

Similarly, on the basis of a direction of a touch input with respect to an image of the user displayed on the display unit 251 during a video call, the controller 180 may change the image of the user to a different image and control a function related to the video call on the basis of a touch input with respect to the changed different image.

Figure 9:
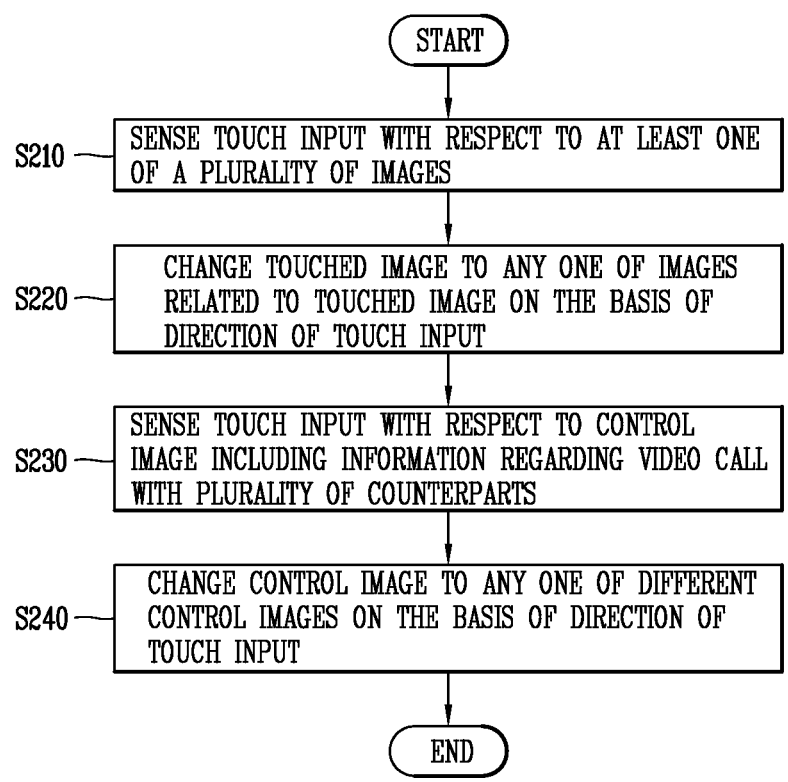
FIG. 9 is a flow chart illustrating a control method of a mobile terminal according to another embodiment of the present invention.

FIG. 9 is a flow chart illustrating a control method of the mobile terminal 100 (See FIG. 1) according to another embodiment of the present invention. The mobile terminal 100 includes the display unit 151 (See FIG. 1), the sensing unit 140 (See FIG. 1), and the controller 180 (See FIG. 1). Here, content already described above with reference to FIG. 3 will be omitted.

Referring to FIG. 9, a touch input with respect to at least one of a plurality of images is sensed in step S210. Next, on the basis of a direction of the touch input, a touched image is changed to any one of images related to the touched image in step S220. Thereafter, a touch input with respect to a control image including information related to a video call of a plurality of counterparts is sensed in step S230.

In detail, the display unit 151 may be configured to allow for a touch input. The display unit 151 may display a control image including information related to the video call of the plurality of counterpart in a first screen region, and display images received from the plurality of counterparts, respectively, in a second screen region. Here, information related to the video call of the plurality of counterparts may include at least one of information regarding the number of times of speaking, information regarding a speaking time, and information regarding speaking order of each of the plurality of counterparts.

The controller 180 may assign a 3D depth value to the control image including the information related to the video call of the plurality of counterparts and each of the images received from the plurality of counterparts. In detail, on the basis of at least one of the information regarding the number of times of speaking, information regarding a speaking time, and information regarding speaking order of each of the plurality of counterparts, the controller 180 may control the 3D depth values of the control image including the information related to the video call of the plurality of counterparts and the respective images received from the plurality of counterparts. Accordingly, the user can recognize a speaking share of each of the plurality of counterparts by intuition.

The sensing unit 140 may sense a touch input with respect to at least one of the plurality of images. Also, the sensing unit 140 may detect a type and a direction of the sensed touch input.

Next, on the basis of the direction of the touch input, the control image is changed to any one of different control images in step S240.

In detail, the control image may include an image for controlling a function related to the video call with respect to all or some of the plurality of counterparts. The control image may include, for example, an input window for receiving at least one of information regarding the number of times of speaking, information regarding a speaking time, and information regarding speaking order of each of the plurality of counterparts, and a control window for grouping some of the plurality of counterparts.

The controller 180 may change the control image into any one of such images. In this case, the control image to be changed may be determined on the basis of the detected direction of the touch input.

In detail, when a touch input in one direction with respect to the control image is sensed, the controller 180 may provide an animation effect that a 3D rectangular parallelepiped rotates by 90 degrees in one direction. Thereafter, a different control image corresponding to the front side of the 90-degree rotated 3D rectangular parallelepiped may be displayed on the display unit 151.

Also, when a touch input in one direction with respect to the control image is sensed, the controller 180 may provide an animation effect that a page is turned in one direction. Thereafter, a different control image corresponding to a next page may be displayed on the display unit 151.

Meanwhile, although not shown, when a touch input is sensed within a reference time with respect to the changed image, the controller 180 may control a function related to the video call with respect to the selected counterpart in response to the touch input. Meanwhile, when a touch input is not sensed within the reference time with respect to the changed image, the controller 180 may restore the changed control image into the control image before the change.

As described above, in the mobile terminal 100 and the control method thereof according to another embodiment of the present invention, when the user performs a video call simultaneously with a plurality of counterparts, the control window displayed to control the video call function does not cover any of a plurality of images. Thus, the user can properly, wholly view the plurality of images without having to perform complicated manipulation.

Figure 10:
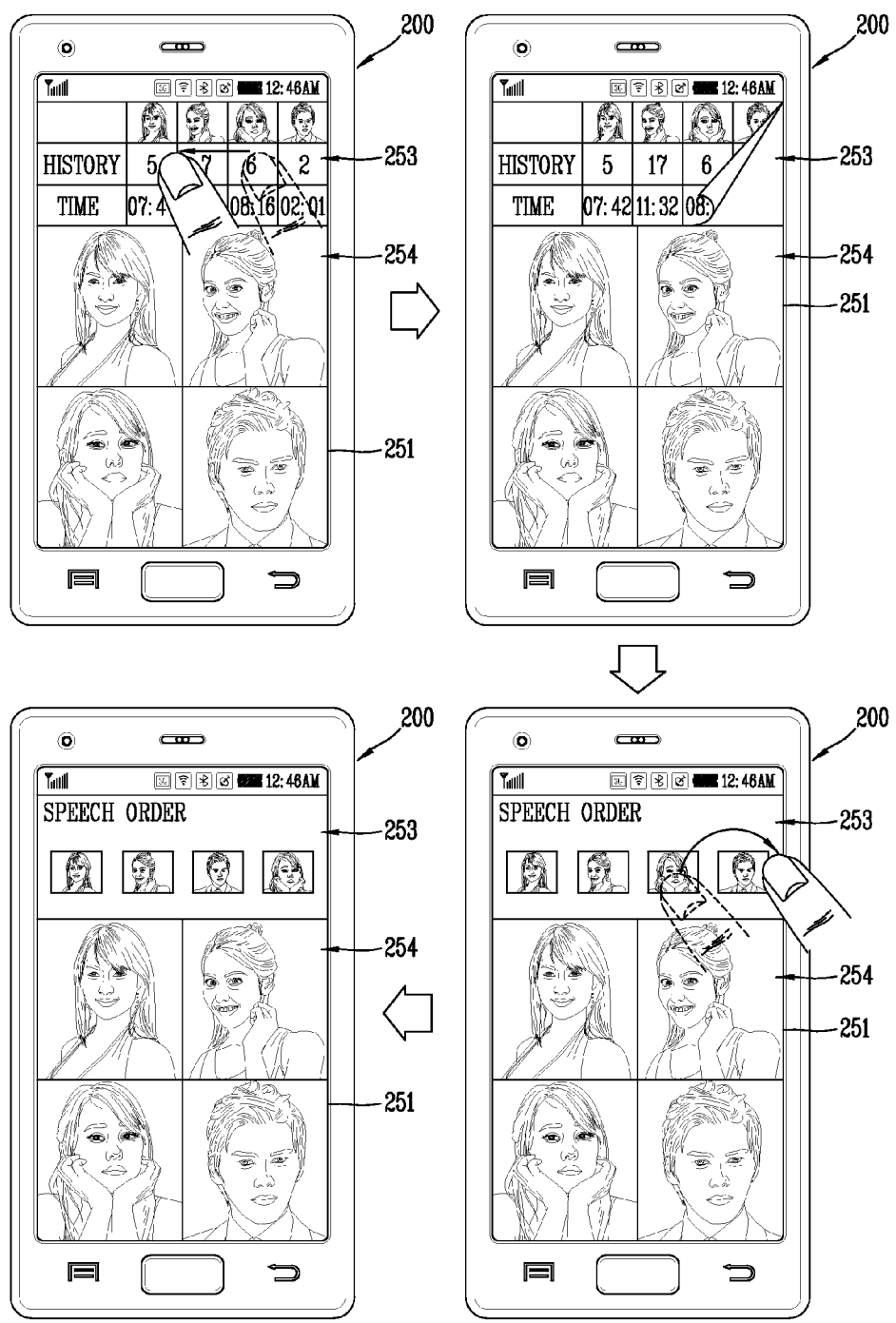
FIGS. 10 to 13 are conceptual views showing operational examples of the mobile terminal in FIG. 9.

FIG. 10 is a conceptual view showing an operational example of the mobile terminal 200 according to FIG. 9. The mobile terminal 200 includes the display unit 251, the sensing unit 140 (See FIG. 1), and the controller 180 (See FIG. 1).

Referring to FIG. 10, a control image may be displayed in a first screen region 253 of the display unit 251 during a video call. As illustrated, the control image may include information regarding the number of times of speaking, information regarding a speaking time, and information regarding speaking order of each of the plurality of counterparts.

Here, when a touch input with respect to the control image is sensed, for example, when a flick gesture in a first direction (from right to the left) is sensed, the controller 180 may change the control image (hereinafter, referred to as a 'first image') to a different control image (hereinafter, referred to as a 'second image').

In detail, as illustrated, when a flick gesture in the first direction with respect to the first image is sensed, the controller 180 may provide an animation effect that a page is turned in the first direction. Thereafter, the second image corresponding to a next page may be displayed on the display unit 251.

In this case, the second image may include a control window for controlling a function related to the video call with respect to all or some of the plurality of counterparts. For example, as illustrated, the second image may include an input window for receiving the information regarding speaking order with respect to each of the plurality of counterparts.

Thereafter, as illustrated, with the second image displayed on the display unit 251, when the information regarding speaking order with respect to each of the plurality of counterparts is input, the controller 180 may control speaking order with respect to each of the plurality of counterparts in response to the touch input.

Also, while changing the second image to the first image, the controller 180 may display the information regarding speaking order in the control image displayed in the first screen region 253 and each of the images received from the plurality of counterparts, respectively, displayed in the second screen region 254. Meanwhile, although not shown, the controller 180 may transmit a message including the information regarding speaking order of each of the plurality of counterparts to all or some of the plurality of counterparts.

Figure 11:
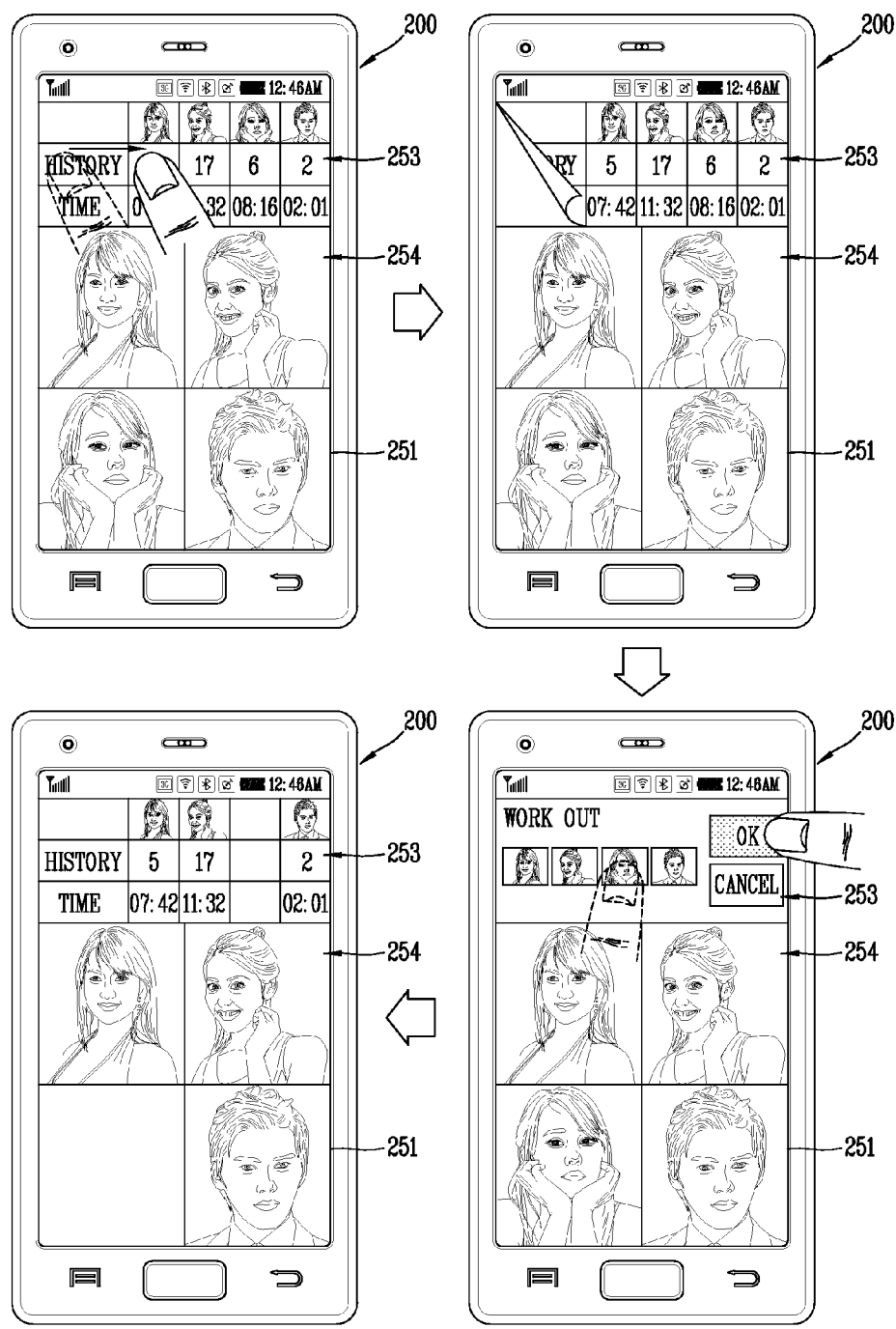

FIG. 11 is a conceptual view showing an operational example of the mobile terminal 200 according to FIG. 9. The mobile terminal 200 includes the display unit 251, the sensing unit 140 (See FIG. 1), and the controller 180 (See FIG. 1).

Referring to FIG. 11, when a touch input with respect to a control image displayed in the first screen region 253 of the display unit 251 is sensed during a video call, for example, when a flick gesture in a second direction (from left to the right) is sensed, the controller 180 may change a control image (hereinafter, referred to as a 'first image') to a different control image (hereinafter, referred to as a 'second image'). The second image may include, for example, a control window for withdrawing at least one of the plurality of counterparts from the video call. In this case, the second image may include thumbnail images corresponding to the images received from the plurality of counterparts, respectively.

Thereafter, as illustrated, with the second image displayed on the display unit 251, when a touch input with respect to at least one of the thumbnail images is sensed, the controller 180 may perform a controlling operation of withdrawing a counterpart (hereinafter, referred to as a 'selected counterpart') corresponding to the touched thumbnail image from the video call.

In detail, the controller 180 may terminate a call with the selected counterpart. Also, while changing the second image to the first image, the controller 180 may make information related to a video call of the selected counterpart, which has been displayed in the first screen region, and the image received from the selected counterpart, which has been displayed in the second screen region, disappear.

Meanwhile, although not shown, the second image may include a control window allowing a new counterpart to join the video call. In detail, with the second image displayed on the display unit 251, when a contact number of a new counterpart is input, the controller 180 may connect a call to the new counterpart. Also, while changing the second image to the first image, the controller 180 may display information related to the video call of the new counterpart in the first screen region and display an image received from the new counterpart in the second screen region.

Figure 12:
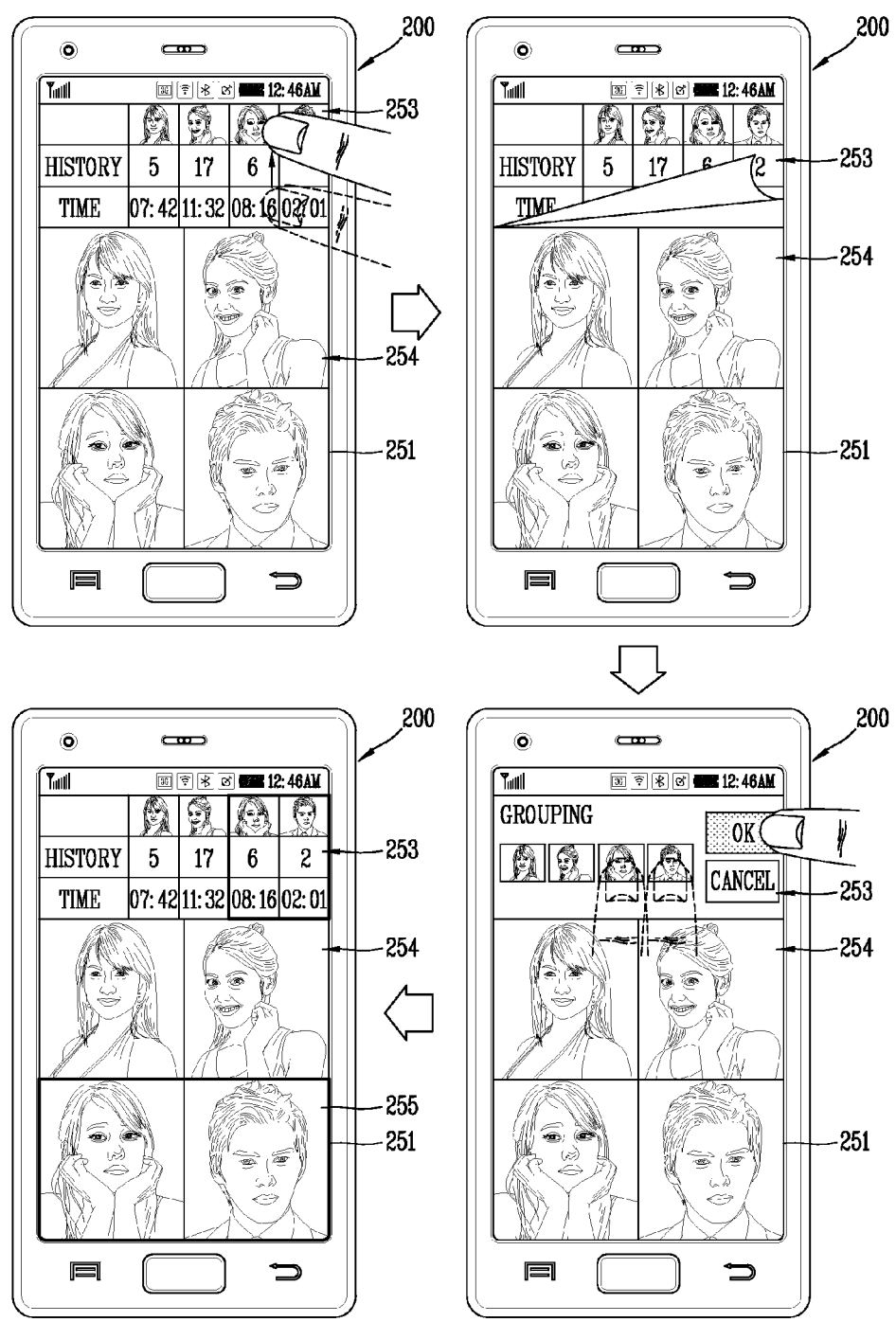
Figure 13:
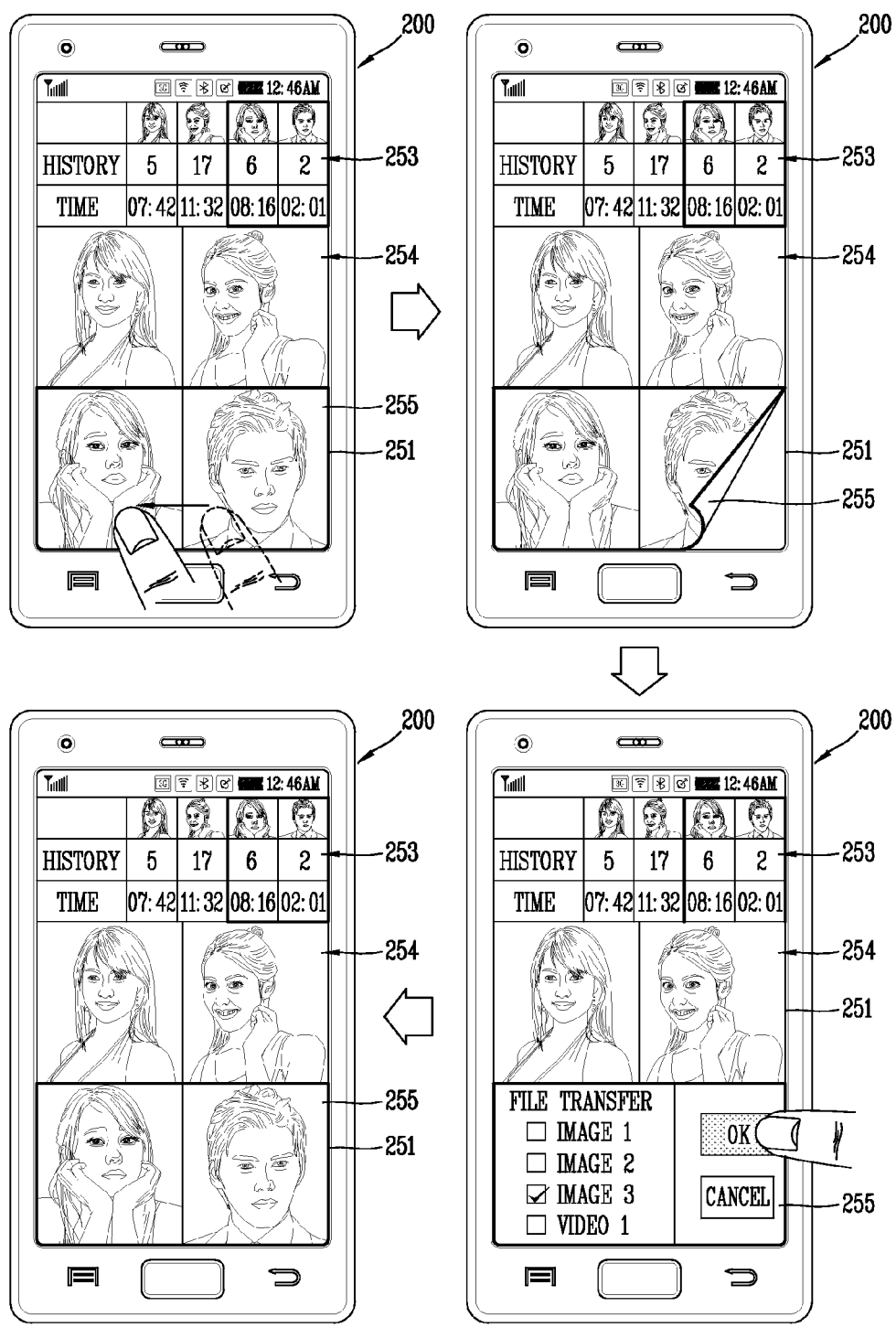

FIGS. 12 and 13 show conceptual views showing operational examples of the mobile terminal 200 according to FIG. 9. The mobile terminal 200 includes the display unit 251, the sensing unit 140 (See FIG. 1), and the controller 180 (See FIG. 1).

Referring to FIG. 12, when a touch input with respect to a control image displayed in the first screen region 253 of the display unit 251 is sensed during a video call, for example, when a flick gesture in a third direction (in an upward direction) is sensed, the controller 180 may change a control image (hereinafter, referred to as a 'first image') to a different control image (hereinafter, referred to as a 'second image'). The second image may include, for example, a control window for grouping some of the plurality of counterparts. In this case, the second image may include thumbnail images corresponding to the images received from the plurality of counterparts, respectively.

Thereafter, as illustrated, with the second image displayed on the display unit 251, when a touch input with respect to some of the thumbnail images is sensed, the controller 180 may group counterparts (hereinafter, referred to as a 'selected counterparts') corresponding to the touched thumbnail images from the video call.

Also, while changing the second image to the first image, the controller 180 may group images received from the selected counterparts to display a grouped image on the display unit 251. For example, the controller 180 may display the images received from the selected counterpart such that the edges surrounding the received images are emphasized.

Meanwhile, although not shown, with the first image displayed on the display unit 251, when a touch input with respect to some of the images received from the plurality of counterparts, respectively, is sensed, the controller 180 may group the counterparts corresponding to the touched images in response to the touch input.

Meanwhile, Referring to FIG. 13, with the images received from the selected counterparts displayed as a group on the display unit 251, when a touch input with respect to the grouped images is sensed within a reference time, the controller 180 may control a function related to the video call with respect to the counterparts corresponding to the grouped images together in response to the touch input.

In detail, when a touch input with respect to grouped images is sensed, for example, when a flick gesture in the first direction (from right to the left) is sensed, the controller 180 may change the grouped images (hereinafter, referred to as 'first images') to a different control image (hereinafter, referred to as a 'second image'). The second image may include, for example, a control window for transmitting content to the grouped counterparts.

Thereafter, as illustrated, with the second image displayed on the display unit 251, when a touch input related to selection of content is sensed, the controller 180 may perform a controlling operation for transmitting the selected content to each of the grouped counterparts, while changing the second image to the first images in response to the touch input.

Meanwhile, although not shown, when a touch input with respect to the grouped images is not sensed within the reference time, the controller 180 may release the grouping of the grouped counterparts.

Figure 14:
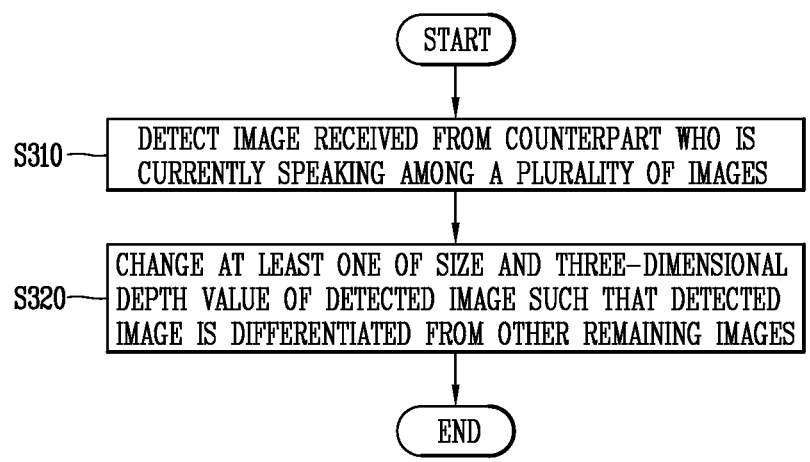
FIG. 14 is a flow chart illustrating a control method of a mobile terminal according to another embodiment of the present invention.

FIG. 14 is a flow chart illustrating a control method of the mobile terminal (See FIG. 1) according to another embodiment of the present invention. The mobile terminal 100 includes the display unit 151 (See FIG. 1), the sensing unit 140 (See FIG. 1), and the controller 180 (See FIG. 1).

Referring to FIG. 14, first, an image received from a counterpart who is currently speaking among a plurality of images is detected in step S310.

In detail, the controller 180 may discriminate a counterpart currently who is currently speaking from among a plurality of counterparts. Thus, the controller 108 may detect an image corresponding to the discriminated counterpart among the plurality of images.

Next, at least one of a size and a 3D depth value of the detected image is changed such that the detected image is differentiated from the other remaining images in step S320.

Here, the term 3D "depth value" refers to an index indicating a difference in distance between objects included in a 3D image. In detail, on the basis of the screen of the display unit 151 in a 3D form, a depth value of an object seen to be outwardly protruded may be defined by a negative number. Meanwhile, a depth value of an object seen to be inwardly depressed in the mobile terminal 100 may be defined by a positive number. Also, a position at which an object included in a 3D image in an outwardly protruded form is seen is within a shorter distance, an absolute value of the depth value of the object is increased, and a position at which an object included in a 3D image in an inwardly depressed form is seen is within a longer distance, an absolute value of the depth value of the object is increased.

The controller 180 may control a 3D depth value of the image received from the counterpart who is currently speaking and that of at least one of the other remaining images such that the detected image, namely, the image received from the counterpart who is currently speaking and the other remaining images have different 3D depth values. Accordingly, the image received from the counterpart who is currently speaking and the other remaining images may be displayed with mutually different 3D depth values, respectively, on the display unit 151.

For example, in a state in which 2D images received from the plurality of counterparts are displayed on the display unit 151, when a touch input for changing a 2D image to a 3D image is sensed, the controller 180 may control the 3D depth values of the image received from the counterpart who is currently speaking and at least one of the other remaining images, while changing the 2D image to the 3D image.

Also, the controller 180 may capture 2D images or 3D images received from the plurality of counterparts, respectively, and share the captured images by using an SNS, a text message, an e-mail, or the like.

As described above, in the mobile terminal 100 and the control method thereof according to another embodiment of the present invention, since a stereoscopic effect is provided to the image received from the counterpart who is currently speaking among the plurality of counterparts, the image received from the counterpart who is currently speaking can be emphasized. Accordingly, the user can recognize the counterpart who is currently speaking by intuition. As a result, user convenience can be improved.

Figure 15:
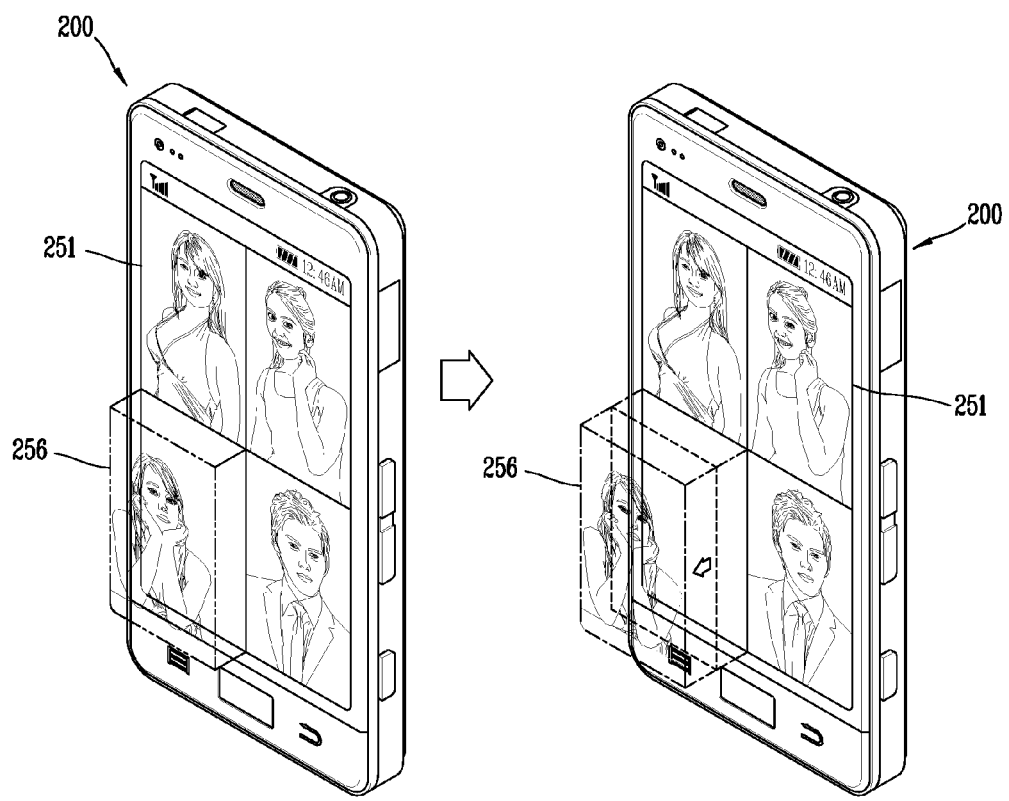
FIG. 15 is a conceptual view showing operational examples of the mobile terminal in FIG. 14.

FIG. 15 is a conceptual view showing operational examples of the mobile terminal in FIG. 14. The mobile terminal 200 includes the display unit 251, the sensing unit 140 (See FIG. 1), and the controller 180 (See FIG. 1).

Referring to FIG. 15, images received from the plurality of counterparts, respectively, may be displayed on the display unit 251. In this case, the controller 180 may control a 3D depth value of the image 256 received from the counterpart who is currently speaking such that it is differentiated from the other remaining images. Accordingly, the image 256 received from the counterpart who is currently speaking may be displayed such that it is outwardly protruded in the mobile terminal 200 on the basis of the display unit 251.

Meanwhile, on the basis of information regarding a speaking time of the counterpart who is currently speaking, a 3D depth value of the image 256 received from the counterpart who is currently speaking may be gradually changed. Thus, until when the speaking of the counterpart who is currently speaking is finished, the image 256 received from the counterpart who is currently speaking may be displayed to be further outwardly protruded in the mobile terminal 200 on the basis of the display unit 251.

Although not shown, the controller 180 may control at least one of a size and a 3D depth value of each of the images received from the plurality of counterparts on the basis of at least one of information regarding the number of times of speaking, information regarding a speaking time, and information regarding speaking order of each of the plurality of counterparts.

In the embodiments of the present invention, the foregoing method can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display unit configured to display a plurality of images received from a plurality of counterparts during a video call;

a sensing unit configured to sense a touch input to at least one of the plurality of images; and a controller configured to:

control the display unit to change the display of a touched at least one of the plurality of images to a changed image that is related to the touched at least one of the plurality of images, wherein the changed image comprises an input window, and the changed image is determined based on a direction of movement of the sensed touch input;

control a function related to a video call with a counterpart when a second touch input to the changed image is sensed within a reference time;

control the display unit to restore the display of the touched at least one of the plurality of images, which was displayed prior to display of the changed image, when the second touch input is not sensed within the reference time;

sense a third touch input applied to the input window;

change a trace of the third touch input applied to the input window to at least image data or text data and store the image data or text data in a memory;

sense a fourth touch input received after the trace of the third touch input is changed; and control the display unit to restore the display of the touched at least one of the plurality of images, which was displayed prior to display of the changed image, and display the at least image data or text data on the touched at least one of the plurality of images when the controller senses the fourth touch input.

2. The mobile terminal of claim 1, wherein the controller is further configured to:

change the trace of the third touch input to the text data and store the text data in the memory when the trace of the third touch input is recognized as a handwritten character.

3. The mobile terminal of claim 1, wherein the controller is further configured to:

control the display unit to display a control image comprising information related to the video call with the plurality of counterparts in a first screen region of the display unit;

control the display unit to display the plurality of images received from the plurality of counterparts in a second screen region of the display unit;

sense a direction of movement of a touch input to the control image; and change the control image to a different control image based on the sensed direction of movement of the touch input to the control image.

4. The mobile terminal of claim 3, wherein the controller is further configured to:

sense a touch input to the different control image;

control a function related to the video call when the touch input to the different control image is sensed within a reference time; and control the display unit to restore the display of the control image, which was displayed prior to display of the different control image, when the touch input to the different control image is not sensed within a reference time.

5. The mobile terminal of claim 4, wherein the information related to the video call comprises at least information regarding a number of speaking times for each of the plurality of counterparts, information regarding a speaking duration for each of the plurality of counterparts, or information regarding a speaking order for each of the plurality of counterparts.

6. The mobile terminal of claim 5, wherein:

the different control image comprises an input window configured for receiving information regarding at least a limitation of the number of speaking times for each of the plurality of counterparts, a limitation of the speaking duration for each of the plurality of counterparts, or the speaking order for each of the plurality of counterparts; and the controller is further configured to transmit the information received from the input window to at least one of each of the plurality of counterparts.

7. The mobile terminal of claim 4, wherein:

the different control image comprises thumbnail images corresponding to the plurality of images received from the plurality of counterparts; and the controller is further configured to:

sense touch inputs of at least one of the thumbnail images and at least one of the received plurality of images, and group two or more of the plurality of counterparts in response to the sensed touch inputs of the at least one of the thumbnail images and the at least one of the received plurality of images.

8. The mobile terminal of claim 7, wherein the controller is further configured to:

group two or more of the received plurality of images corresponding to the grouped two or more of the plurality of counterparts;

control the display unit to display the grouped two or more of the received plurality of images;

sense a touch input applied to the grouped two or more of the received plurality of images;

control a function related to the video call with the grouped two or more of the plurality of counterparts when the touch input applied to the grouped two or more of the received plurality of images is sensed within a reference time; and release the grouping of the two or more of the plurality of counterparts when the touch input applied to the grouped two or more of the received plurality of images is not sensed within the reference time.

9. The mobile terminal of claim 1, wherein the controller is further configured to control at least a size or a three-dimensional depth value of an image received from a speaking counterpart of one of the plurality of counterparts such that the image received from the speaking counterpart is differentiated from other images received from other counterparts of the plurality of counterparts.

10. The mobile terminal of claim 9, wherein the controller is further configured to gradually change the at least size or three-dimensional depth value based on information regarding a speaking duration of the speaking counterpart.

11. The mobile terminal of claim 1, wherein the controller is further configured to control at least a size or a three-dimensional depth value of each of the plurality of images based on at least information regarding a number of speaking times of each of the plurality of counterparts, information regarding a speaking duration of each of the plurality of counterparts, or information regarding a speaking order of each of the plurality of counterparts.

12. A control method of a mobile terminal including a display unit configured to receive a touch input and display a plurality of images received from a respective plurality of counterparts during a video call, the method comprising:

sensing a direction of movement of a touch input to at least one of the received plurality of images;

displaying a changed image based on the direction of movement of the touch input to the at least one of the received plurality of images, wherein the changed image is related to the at least one of the plurality of images and comprises an input window;

controlling a function related to a video call with a counterpart when a second touch input to the changed image is sensed within a reference time;

restoring the display of the touched at least one of the plurality of images, which was displayed prior to display of the changed image, when the second touch input is not sensed within the reference time;

sensing a third touch input applied to the input window;

changing a trace of the third touch input applied to the input window to at least image data or text data and storing the image data or text data in a memory;

sensing a fourth touch input received after the trace of the third touch input is changed; and restoring the display of the touched at least one of the plurality of images, which was displayed prior to display of the changed image, and displaying the at least image data or text data on the touched at least one of the plurality of images when the fourth touch input is sensed.

13. The method of claim 12, further comprising:

displaying a control image, wherein the control image includes information related to a video call with the plurality of counterparts;

sensing a direction of a touch input to the displayed control image; and changing the control image to a different control image based on a sensed direction of the touch input to the control image.

* * * * *